June 12, 1956      J. O. ROESER      2,750,463

ELECTRIC SWITCHES OF THE SNAP-ACTION TYPE

Filed July 12, 1952      2 Sheets-Sheet 1

INVENTOR.
John O. Roeser
BY Clarence E. Thrudy
HIS ATTORNEY.

June 12, 1956 J. O. ROESER 2,750,463
ELECTRIC SWITCHES OF THE SNAP-ACTION TYPE
Filed July 12, 1952 2 Sheets-Sheet 2
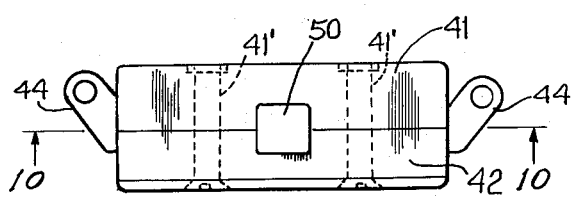
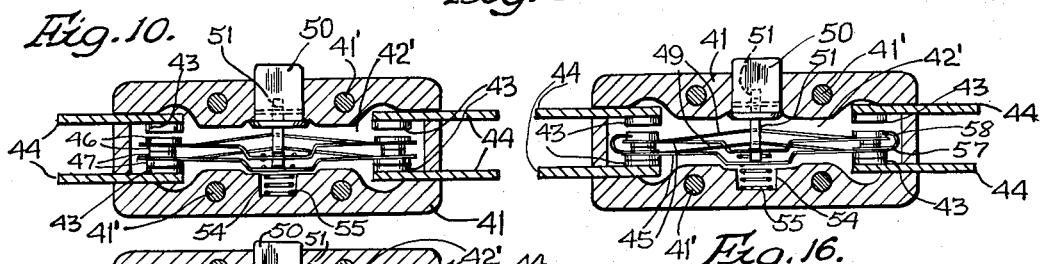
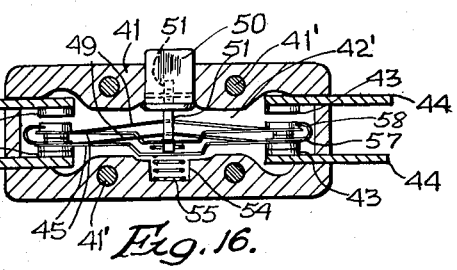
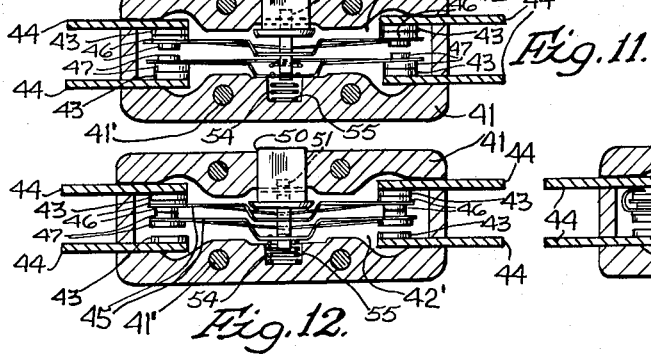
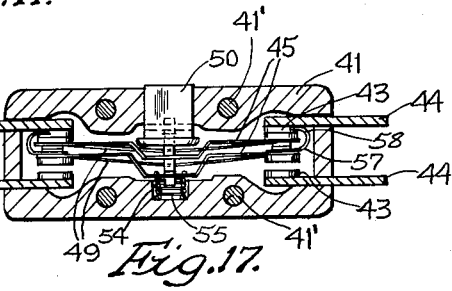
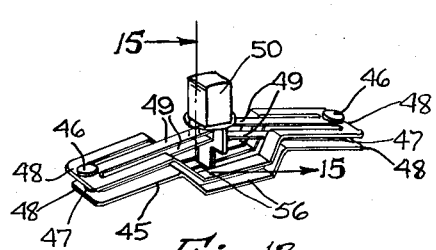
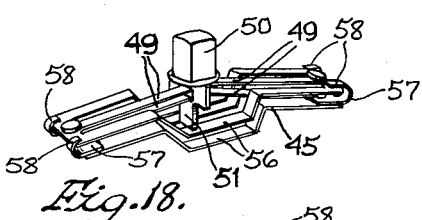
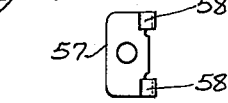
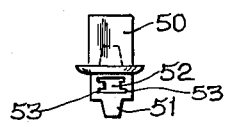
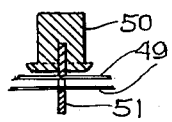
INVENTOR.
John O. Roeser
BY Clarence E. Ohmedy
His ATTORNEY.

United States Patent Office 2,750,463
Patented June 12, 1956

2,750,463
ELECTRIC SWITCHES OF THE SNAP-ACTION TYPE

John O. Roeser, Chicago, Ill., assignor to Electro-Snap Switch & Mfg. Co., a corporation of Illinois Application July 12, 1952, Serial No. 298,607

4 Claims. (Cl. 200—67)

This invention relates to new and useful improvements in electric switches of the snap-action type and it is an object of this invention to provide a switch of the character hereinafter described which will be adaptable for many uses.

Another object of the invention is to provide a snap-action electric switch having a double-pole double-throw action, the double throw being simultaneous.

Another object of the invention is to provide an electric switch in which there is a small movement of the movable contacts in their movement from and into contact with stationary contacts and one in which there will result hammer-blow action of the movable contacts into contact with the fixed contacts.

Yet another and equally important object of the invention is the provision of a snap-action switch which will be free from vibratory effects, have full contact force up to operation, and one which is especially adapted for use where the actuator is of slow action, as, for example, a diaphragm.

Another object of the invention is to provide a switch of the character hereinafter described which comprises relatively few parts, thereby greatly facilitating assembly and permitting economical manufacture.

Yet another and equally important object of the invention is to provide in an electric switch pairs of contacts with one pair of contacts capable of remaining in contact with their adjacent stationary contacts until the other pair of contacts has moved into engagement with their corresponding stationary contacts, thus resulting in a switch which has fast movement of its movable contacts without any appreciable delay.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 9 is a top plan view of another form of electric switch embodying the invention;

Fig. 10 is a sectional detail view taken substantially on line 10—10 of Fig. 9;

Fig. 11 is a sectional detail view similar to Fig. 10, but showing the actuator and spring plates in their respective positions prior to completion of movement of the actuator;

Fig. 12 is a sectional detail view similar to Fig. 10, but showing the parts thereof in different positions with respect to each other;

Fig. 13 is a perspective view of spring plates and actuator therefor embodied in the form shown in Fig. 10;

Fig. 14 is a fragmentary sectional detail view of the actuator embodied in the form shown in Fig. 10;

Fig. 15 is a fragmentary sectional detail view of the actuator taken substantially on line 15—15 of Fig. 13;

Fig. 16 is a sectional detail view similar to Fig. 10, but showing a slightly modified form of construction;

Fig. 17 is a sectional detail view similar to Fig. 16, but showing the parts thereof in different positions with respect to each other;

Fig. 18 is a perspective view of the spring plates and actuator therefor as shown in Fig. 17;

Fig. 19 is a plan view of a tie plate embodied in the form of construction shown in Fig. 16.

Figure 1:
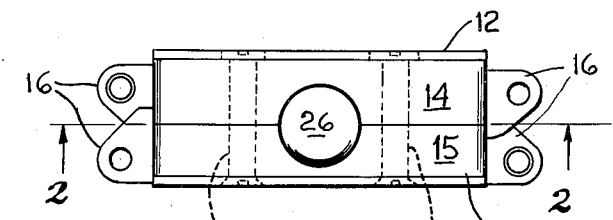
Fig. 1 is a plan view of one form of a snap-action switch embodied in the invention.

The several expressed and salient objects of the invention are accomplished by the preferred form of construction shown in the accompanying drawings. In this connection, referring particularly to Figs. 1 to 8, inclusive, my improved electric switch comprises at least two switch units A and B arranged in superimposed position with respect to each other upon a suitable mounting plate 12. Each unit comprises enclosure sections 14 and 15 connected to each other and to the mounting plate 12 by means of screws 13. These sections 14 and 15 are of similar shape and construction and provide together a hollow interior 15' into which the operating parts of my electric switch are confined.

The electric switch as shown in Figs. 1 to 8 inclusive comprises terminal arms 16 which project into the switch units. These terminal arms at their interior end portions are provided with stationary contacts 17. These stationary contacts 17 are adapted to be engaged alternately by contacts 18 arranged in pairs and each pair carried by a spring plate 19. Each spring plate 19 provides a bight portion 20 from which confronting tongues 21 extend inwardly toward each other from the bight portions 20. The medial portion 23 of the spring plate 19 is laterally displaced as at 19' so as to bear the contacting ends of the tongues together whereby to create a bias which results in over-center flexing of the tongues with respect to a straight long axis.

Figure 2:
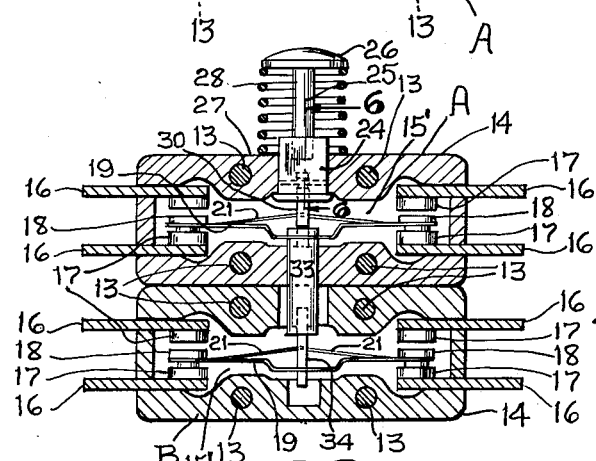
Fig. 2 is a sectional detail view taken substantially on line 2—2 of Fig. 1.
Figure 3:
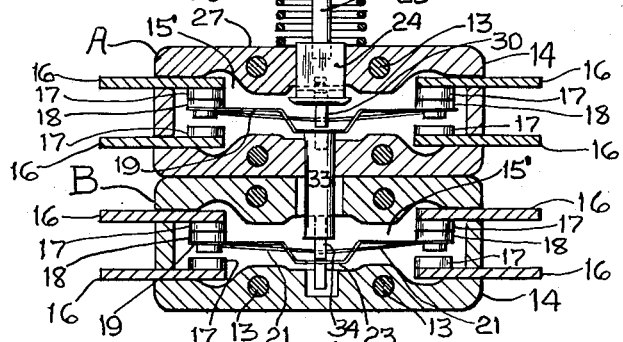
Fig. 3 is a sectional detail view similar to Fig. 2, but showing the parts thereof in different positions.

The means for biasing these plates comprises in the form shown in Figs. 2 and 3 a plunger 24 having an outwardly extending stem 25 carrying an actuator button 26. Embracing the stem 25 and disposed between the button 26 and the adjacent surface 27 of the switch unit A, is an expansion spring 28.

Figures 4, 5:
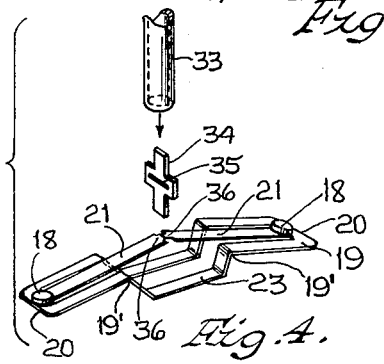
Fig. 4 is a perspective view of certain of the operating parts of the switch illustrated in Fig. 2, but showing such parts in exploded relation with respect to each other.
Fig. 5 is a perspective view of such parts in assembled relation with respect to each other.
Figure 6:
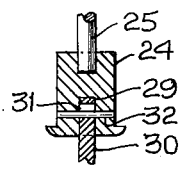
Fig. 6 is a fragmentary sectional detail view of the actuator, taken substantially on line 6—6 of Fig. 2.

The plunger 24 is provided with a socket 29 into which partially extends an actuating stem 30. This stem 30 is provided with an elongated slot 31 through which projects a pin 32 (Fig. 6). This pin is of a diameter less than the height of the slot 31 so that under conditions to be presently explained, this stem 30 may have continued movement after the plunger 24 has reached its extreme position of movement. The stem 30 has its lower end portion attached to an intermediate plunger 33 which in turn is connected to an actuating stem 34. The actuating stems 30 and 34 are each provided with horizontal slots 35, into which project the abutting reduced adjacent end portions 36 of the confronting tongues 21 (Fig. 5).

In Fig. 2 I have shown the movable contacts 18 in contact with the lower stationary contacts 17. To move these contacts 18 simultaneously and without delay into engagement with the upper of the stationary contacts 17, pressure is applied to the button 26 either manually or by mechanical means, to move the plungers 24 and 33 downwardly.

This movement of the plungers places pressure upon the spring tongues 21, with the result that they bias the spring plates 19 to snap the movable contacts 18 from engagement with the lower of the stationary contacts 17 into engagement with the upper of the stationary contacts 17. Should it result in this operation that the tension of the spring tongues 21 of the lower of the spring plates 19, as shown in Figs. 2 and 3, is such that its action is faster than the spring tongues 21 of the upper spring plates 19, such faster action will cause the plunger 33 to move independently of the plunger 24, with the result that notwithstanding this differential of spring pressure of the tongues 21, the action of making and breaking contact between the movable contacts 18 and the stationary contacts 17, will nevertheless be speedy and simultaneous. This independent movement of the plunger 33 is permitted by reason of the slot and pin connection between the stem 30 and the plunger 24. Such additional movement is caused by the reversal of the reaction force of the spring tongues 21 against the plunger 33 at the moment it snaps over center.

By this construction I have provided an electric switch of the double-pole double-throw type in which the making and breaking of the contacts is simultaneous, speedy and without any appreciable delay. Such a switch is especially useful where quick snap action is desirable.

Figure 7:
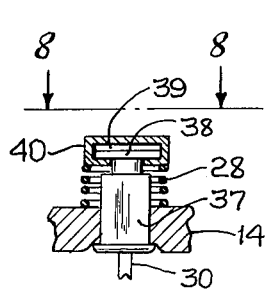
Fig. 7 is a sectional detail view of a modified form of construction of an actuator embodied in the invention.
Figure 8:
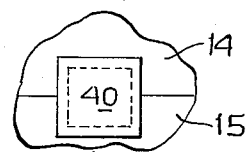
Fig. 8 is a top plan view of the same.

In Figs. 7 and 8 I have illustrated a modified form of construction of the actuator indicated at 24 in Fig. 2. In this connection, the actuator 37 has a relatively flat head 38 which operates in a hollow 39 of a button 40. This hollow 39 permits the plunger 37 to move independently of the button 40, with the result that the same simultaneous action is obtained as in the construction embodying the form of actuator indicated at 24.

In Figs. 9 to 19 inclusive I have illustrated an electric switch, which like the switch illustrated in Figs. 1 to 8 inclusive, comprises enclosure sections 41 and 42 of the same form and construction as the enclosure sections 14 and 15, and connected together by screws 41'. In the hollow 42' of this switch formed by the enclosure sections are arranged the actuating parts of the switch. The stationary contacts are indicated at 43 and are carried by terminals 44 arranged in pairs, with the contacts of one pair in opposed relation to the contacts of the other pair. The spring plates are indicated at 45 and are arranged in superimposed position with respect to each other and each are provided with contacts 46 and 47. Extending inwardly from the bight portions 48 of these plates 45 are spring tongues 49 similar in construction and function to that of the tongues 21 of the form of construction shown in Figs. 1 to 8 inclusive.

An actuator is indicated at 50 (Figs. 9 to 15 inclusive). This actuator carries a stem 51 of the form of construction shown in Figs. 14 and 15. This stem 51 has a cut-out portion 52 which provides oppositely disposed notches 53. Into these notches 53 the adjacent ends of the tongues 49 project. A spring pocket 54 is provided for seating an expansion spring 55 serving to project the actuator to its outermost position with respect to the switch enclosure.

Each spring plate 45 is similar in construction and function to that of the spring plates 19 of the form shown in Figs. 1 to 8 inclusive and each has a medial offset portion 56 which braces the spring tongue 49 for over-center flexing.

In the form of construction shown in Figs. 9 to 15 inclusive, the initial movement of the actuator 50 will cause the upper of the spring plates 45 to snap over center so that the movable contacts, both upper and lower, are in engagement with the stationary contacts 43, as shown in Fig. 11. Continued movement of the plunger 50 flexes the lower of the spring plates 45 to move the movable contacts thereof away from the lower of the stationary contacts 43. It will be apparent that movement of these contacts is such that a second circuit is completed before the initial circuit is broken. In the art, this is known as a "make-before-break switch." The spring tongues 49 of the two contact springs are arranged so that the distance between them along the stem 51 is less than the distance separating their ends adjacent to the contacts, causing one spring always to overcenter before the other.

In the form shown in Figs. 16 to 19 inclusive, the structure there illustrated is substantially the same as that shown in Figs. 9 to 15. In Figs. 16 to 19, parts similar to those employed in the form shown in Figs. 9 to 15 will be indicated by similar reference characters. In the modified form of construction shown in Figs. 16 to 19, the lower spring plate of the plates 45 at opposite end portions thereof has connected thereto a tie plate 57. This tie plate 57 has inwardly turned fingers 58 which, when the spring plates 45 are in position shown in Figs. 16 and 17, are normally out of contact with the upper plate of the spring plates 45. In this form of construction should the lower plate of the spring plates 45, when in the position shown in Fig. 17, be flexed before the flexing of the upper plate of the spring plates 45, the curled fingers 58 will contact the opposite ends of the upper plate of the spring plates 45 and effect flexing of such upper plate, whereby to move the contacts of such upper plate simultaneously with the movement of the contacts of the lower plate of the spring plates 45.

In this form of construction, separation of the movable contacts from the stationary contacts is brought about quickly and without any appreciable delay and simultaneously with the flexing of the lower plate of the spring plates 45 and in hammer-like action. By providing overcentering of the spring farthest from the connected terminals before the other overcenters, the contact pressure is maintained up to actual moment of the snap action of the spring tongues, thereby eliminating vibration effects and making the attainment of good snap action independent of the speed of actuation.

A switch constructed in accordance with the foregoing description is relatively simple, comprising few parts, thereby greatly facilitating assembly and minimizing the cost of manufacture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An electric switch providing at least two pairs of fixed contacts with one pair arranged in superimposed spaced relation with respect to the other pair of fixed contacts, spring plates interposed between the pairs of fixed contacts in superimposed relation with respect to each other and having contacts at opposite end portions with the contacts of corresponding end portions in engagement with respect to each other and adapted to have alternate engagement with respect to the adjacent fixed contacts, said spring plates having corresponding bight portions and spring tongues extending inwardly from the bight portions, a stem connecting the adjacent end portions of the tongues together, an actuating plunger connected to said stem, spring means acting on said stem to move said stem in one direction longitudinally with respect to its length, and a tie plate carried at opposite end portions of one of said spring plates and having curved fingers, the end portions of which overlie adjacent end portions of the other of said spring plates.

2. An electric switch providing at least two pairs of fixed contacts with one pair arranged in superimposed spaced relation with respect to the other pair of fixed contacts, spring plates interposed between the pairs of fixed contacts in superimposed relation with respect to each other and having contacts at opposite end portions with the contacts of corresponding end portions in engagement with respect to each other and adapted to have alternate engagement with respect to the adjacent fixed contacts, said spring plates having corresponding bight portions and spring tongues extending inwardly from the bight portions, a stem connecting the adjacent end portions of the tongues together, an actuating plunger connected to said stem, spring means acting on said stem to move said stem in one direction longitudinally with respect to its length, and a tie plate carried at opposite end portions of one of said spring plates and having curved fingers normally in spaced confronting relation with respect to the other of said spring plates, the end portions of which overlie adjacent end portions of the other of said spring plates for engagement with said other spring plate when said one spring plate is flexed in one direction a predetermined distance.

3. An electric switch providing at least two pairs of fixed contacts with one pair arranged in superimposed spaced relation with respect to the other pair of fixed contacts, spring plates interposed between the pairs of fixed contacts in superimposed relation with respect to each other and having contacts at opposite end portions with the contacts of corresponding end portions in engagement with respect to each other and adapted to have alternate engagement with respect to the adjacent fixed contacts, said spring plates having corresponding bight portions and spring tongues extending inwardly from the bight portions, a stem connecting the adjacent end portions of the tongues together, an actuating plunger connected to said stem, spring means acting on said stem to move said stem in one direction longitudinally with respect to its length, and means carried at opposite end portions of one of said spring plates and movable therewith and engageable with the end portions of the other of said spring plates when one spring plate is flexed in one direction a predetermined amount.

4. An electric switch providing at least two pairs of fixed contacts with one pair arranged in superimposed spaced relation with respect to the other pair of fixed contacts, spring plates interposed between the pairs of fixed contacts in superimposed relation with respect to each other and having contacts at opposite end portions with the contacts of corresponding end portions in engagement with respect to each other and adapted to have alternate engagement with respect to the adjacent fixed contacts, said spring plates having corresponding bight portions and spring tongues extending inwardly from the bight portions, a stem connecting the adjacent end portions of the tongues together, an actuating plunger connected to said stem, spring means acting on said stem to move said stem in one direction longitudinally with respect to its length, means carried at opposite end portions of one of said spring plates and movable therewith and normally out of engagement with the other of said spring plates and having curved fingers, the end portions of which overlie adjacent end portions of said other spring plate and which upon flexing in one direction of said one of said spring plates will engage and flex said other spring plate for simultaneous alternate engagement with respect to said adjacent fixed contacts.

References Cited in the file of this patent

UNITED STATES PATENTS

| | | |
|---|---|---|
| 2,400,754 | Hausler | May 21, 1946 |
| 2,476,056 | Martin | July 12, 1949 |
| 2,487,374 | Riche et al. | Nov. 8, 1949 |
| 2,495,349 | Rohr | Jan. 24, 1950 |
| 2,518,255 | Roeser | Aug. 8, 1950 |
| 2,519,297 | Stump, Jr., et al. | Aug. 15, 1950 |